Oct. 25, 1966

D. WALKER 3,280,721

AUTOMATIC TEA POT

Filed June 26, 1964

INVENTOR
Dorothy Walker

Oct. 25, 1966        D. WALKER        3,280,721

AUTOMATIC TEA POT

Filed June 26, 1964        2 Sheets-Sheet 2

INVENTOR

Dorothy Walker

United States Patent Office 3,280,721
Patented Oct. 25, 1966

3,280,721
AUTOMATIC TEA POT
Dorothy Walker, 11 Pleasant Home Blvd.,
Downsview, Ontario, Canada
Filed June 26, 1964, Ser. No. 378,393
6 Claims. (Cl. 99—282)

This invention relates to improvements in devices for the preparation of beverages and more particularly to improvements in automatic tea pots.

The making of tea as a beverage presents certain problems not encountered with other beverages inasmuch as the dry tea must be introduced into the water only when the latter is boiling and then the source of heat must be cut off in order to stop the boiling while the tea is allowed to "steep" or brew for a certain length of time. It is also preferable to remove the tea bag containing the tea leaves from the water upon the desired concentration being reached in order to prevent "stewing" in which the tea, if not consumed immediately, becomes strong and somewhat bitter.

In my prior application No. 202,643, and now Patent No. 3,132,580, I sought to overcome the majority of these problems by the provision of an automatic teamaker in which dry tea bags are retained in a receptacle, the bottom wall of which is hinged and adapted to be located over the water in a tea pot. Upon the water boiling and creating steam pressure the catch holding the bottom wall in position is tripped, permitting the tea bags to drop into the water, at the same time breaking the circuit to the electrical heating element.

My present invention, although having the same basic principles, seeks to improve over the prior invention by simplifying the mechanism, thus allowing it to be produced more easily and cheaply.

It also improves on the prior art by utilizing an extremely simple catch mechanism which is easily replaceable in the event of its failure.

Another object of the invention is to provide an automatic tea pot which in a modified version includes a means whereby the teabags or the like may be removed from the water after the tea has steeped or brewed for a desired length of time.

Still another object of the invention is to provide an automatic tea pot in which both the simple and modified versions utilize the same basic design and may be converted from any one to the other by the simple expediency of interchanging the lid mechanisms.

These and other objects and features of the invention will become apparent when the following description is read in conjunction with the drawings in which.

Figure 1:
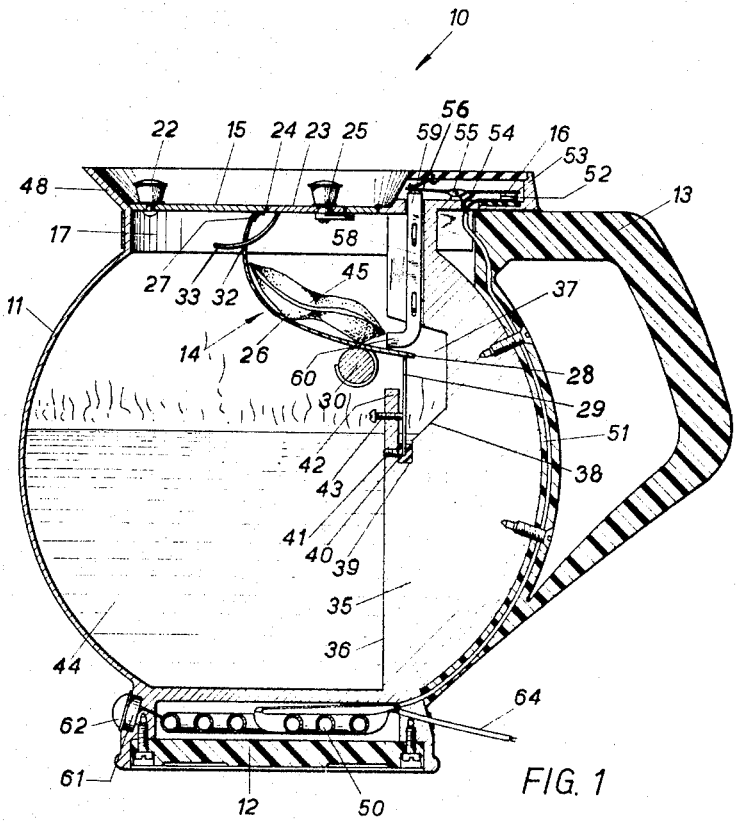
FIG. 1 is a sectional side elevation of an automatic tea pot embodying the instant invention.
Figure 2:
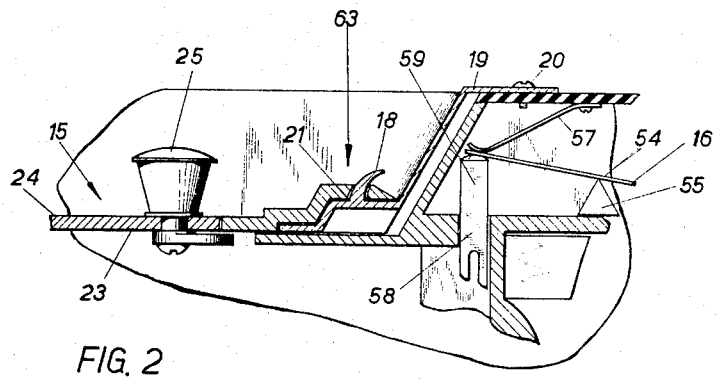
FIG. 2 is an enlarged, sectional side elevation of the lid mechanism of the device of FIG. 1.

Referring to FIGS. 1 and 2, an automatic tea pot 10 embodying my invention includes a vessel 11 of any practical size and shape having a top opening. A heater base assembly 12 supports vessel 11 and provides a stable support for it and also included in tea pot 10 are a handle 13, a teabag dropping mechanism 14 operating in conjunction with a lid 15.

An automatic switch mechanism 16 is operated mechanically by dropping mechanism 14 and is adapted to either make or break the electrical circuit through heater base assembly 12 depending on the position of mechanism 14.

Vessel 11 is, as previously stated, of any practical size and shape generally associated with tea pots and the like, its top opening 17 being completely sealed by lid 15 upon the latter being fully seated thereover. A pouring spout 48 is embodied at the front of vessel 11 while lid 15 is hingedly attached at the rear of vessel 11.

The type of hinge in this particular embodiment is illustrated more fully in FIG. 2, which shows one of the plurality of pins 18 extending upwardly and arcuately rearwardly from a shoe member 19 which is detachably attached to the rear uppermost portion of pot 10 by means of screws 20. Lid 15 is, of course, shaped to conform closely with the contours of opening 17 and a plurality of holes 21 formed adjacent the rear edge thereof are adapted to fit over pins 18. Thus lid 15 is hingedly retained on vessel 11 during the normal lid opening stages but may be quickly and easily detached therefrom by raising it substantially vertical. It should also be noted that the slope rearwardly of pins 18 ensures that the weight of lid 15 forces the rear portion of the lid defining holes 21 downwardly and forwardly to effect a tight closure all round between lid 15 and opening 17, especially in the area of the hinge.

A knob 22 is located at the forward end of lid 15 for the manual opening and removal of lid 15. An access door 23 is formed in lid 15 and is hingedly attached at its forward edge 24 to lid 15. A simple knob and latch mechanism 25 situated at the rear of door 23 permits door 23 to be opened or, by a simple twisting motion, to be closed and locked in relation to lid 15.

Dropping mechanism 14 comprises a curved plate 26 hingedly suspended at its forward, uppermost edge 27 to the underside of lid 15 at a location substantially corresponding to that of the hinged forward edge 24 of door 23. The free, rear edge 28 of plate 26 is adapted to be releasably supported by a reed mechanism 29, the latter consisting of a thin, substantially rigid, plate located in a transverse plane toward the rear of vessel 11 and resiliently yieldable in a fore and aft plane. Thus, from a fully down position, rear edge 28 of plate 26 may be moved upwardly and rearwardly to contact reed 29 which is then caused to yield rearwardly and spring back into place when edge 28 passes thereover and, upon subsequent release, edge 28 thereafter rests on the upper edge of reed 29. Release of edge 28 is effected either by raising lid 15 to cause the upward movement of its hingedly attached plate 26 which is translated into a forward movement of rear edge 28, or, alternatively, by a rearward movement of reed 29. The former method is that utilized in a preferred embodiment of the invention but the latter method falling within the scope of the invention will also be described.

A weight 30 is secured to the underside of plate 26 adjacent to, but spaced apart from, rear edge 28 to ensure a positive drop upon edge 28 being released from reed 29 and to provide a downward, sealing pressure on the lid 15. It also acts as a counter balance during the pouring action to be later described.

A curved wire 31 extends downwardly and forwardly from the undersurface of access door 23 to pass closely through a thin vertical slot 32 in the upper portion of plate 26. A stop 33 forming the forward end of wire 31 is larger than the width of slot 32 so that, upon plate 26 being in its lowermost position, the raising of door 23 is transmitted through wire 31 and stop 33 to plate 26, causing the latter to move arcuately upwardly and edge 28 thereof to contact reed 29 in the manner heretofore described in order to reset plate 26 in its uppermost position.

A reed housing 35 of minor segmental side elevation is adapted to closely fit at the rear of vessel 11 in a vertical plane, the chordal wall 36 thereof being cut out at 37 to accommodate reed 29. Cut out 37 has a downwardly, frontwardly sloping bottom wall 38 terminating at the front in a slot 39 into which the base portion 40 of reed 29 is adapted to be a sliding fit. A grub screw 41 or the like inserted from wall 36 is adapted to contact and retain base portion 40 securely within slot 39. Front wall 36 extends partway over cut out 37 to form a forward stop 42 to support reed 29 and also prevent it from springing forward and upsetting the release timing for end 28 of plate 26. An adjusting screw 43 passes threadedly through stop 42 to contact reed 29 and it will be readily evident that by screwing in the screw 43, the amount of overlap is reduced at end 28 of plate 26 when resting on reed 29 so that plate 26 is released after only a minimal amount of movement of lid 15, whereas by unscrewing screw 43 the amount of overlap is increased, necessitating a greater movement of lid 15 in order to effect the release of end 28.

From the foregoing description, it will be obvious that in this embodiment it is required to cause lid 15 to raise prior to releasing end 28 of plate 26, and this raising is caused by steam pressure generated in vessel 11 by the boiling of water therein, and upon one or more teabags 45 being retained on plate 26, these will be dropped into the water 44 at the release of end 28. The greater the overlap between end 28 and reed 29, the more pressure required to raise lid 15 and thus the setting of this overlap by screw 43 decides the condition of the water from barely boiling to boiling furiously when the bags 45 are released.

Reed 29, alternatively, may be fabricated from a bimetal strip adapted to distort arcuately rearwardly upon being heated so that, upon reaching the temperature of the boiling point of water, it is sufficiently distorted to move clear of end 28 of plate 26, thus permitting plate 26 to fall and deposit teabags 45 into water 44.

Water 44 is boiled by an electrical heating element 50 located in base 12 having conventional electrical supply leads one of which, 51, is routed through handle 13 to embody a switch 16 in series therewith. Switch 16 comprises a fixed contact point 52 and a moving contact point 53, the latter being mounted on a rigid arm 54 which operates over a fulcrum point 55 so that, upon the foremost end 56 of arm 54 being raised, moving contact point 53 is lowered and brought into electrical contact with fixed contact point 52 and the circuit through lead 51 is therefore complete, enabling element 50 to become energized.

A spring member 57 of any conventional and adaptable form is located at end 56 of arm 54 and is adapted to bias end 56 downwardly to break the circuit at points 52 and 53.

A push rod 58 operates in a substantially vertical plane and is slidably supported by the upper portion of reed housing 35, the upper end 59 of rod 58 being juxtaposed end 56 of arm 54 at all times and the lower end 60 extending partway into cut out 37 of housing 35. Rod 58 is of such a length that upon plate 26 being raised, end 28 thereof is adapted to contact end 60 of rod 58, pushing the latter vertically upwardly, causing end 59 to overcome spring 57 and move end 56 of arm 54 up, thereby bringing contact point 53 into point 52. Thus upon plate 26 being in the up position and retained by reed 29, the circuit through element 50 is complete and water 44 is thereby heated.

Upon plate 26 being released when water 44 boils, push rod 58 is no longer supported by end 28 and spring 57 is able to act on arm 54 to break contact, thereby switching off element 50.

From the foregoing description it will be seen that teabags 45 are held clear of water 44 while it is being heated, and deposited therein only when it boils, at which time the circuit through heater 50 is broken and boiling ceases.

A relay 61 wired in parallel with switch 16 is adapted to operate a light or buzzer 62 upon the circuit to element 50 being broken, thereby indicating that the water has stopped boiling and the tea is steeping or brewing.

Figure 3:
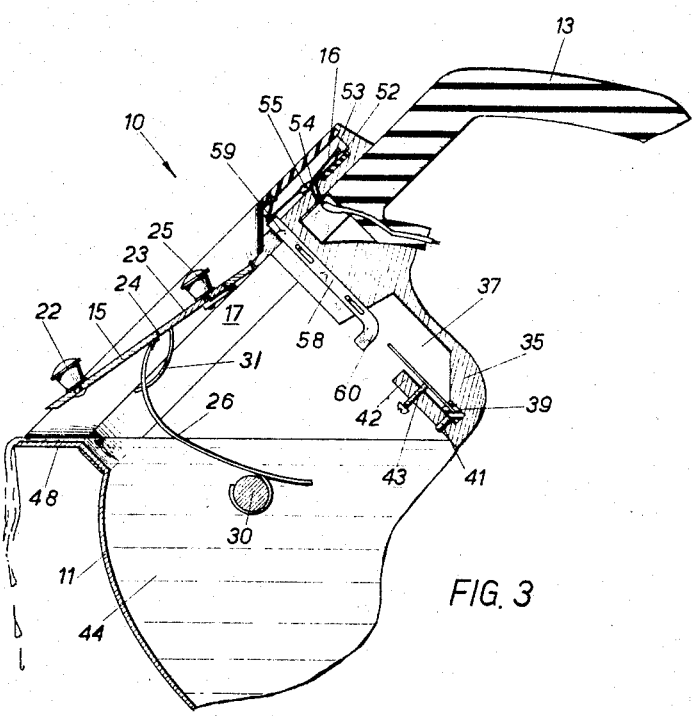
FIG. 3 is a fractional, sectional, side elevation of the upper portion of the tea pot of FIG. 1, illustrating particularly the pouring action of the pot.

Referring also to FIG. 3, it will be seen that upon wishing to pour the liquid team from vessel 11 after the brewing thereof, the pot is tilted forwardly and the lid remains closed until weight 30 is located vertically beneath the hinge, shown at 63, of lid 15. Further tilting of vessel 11 results in the open end 17 thereof moving away from lid 15, the latter remaining stable, so that a gap is provided in the vicinity of spout 48 to permit the liquid to flow freely out of vessel 11.

In use it is merely necessary to fill vessel 11 with the requisite amount of water, close lid 15, raise access door 23 to move plate 26 to its uppermost position, supported by reed 29. Teabags 45 are then inserted through the aperture uncovered by door 23, to rest on plate 26. Door 23 is then closed and latched. The electrical lead 64 may thereafter be plugged into a conventional electrical outlet and upon the tea commencing to brew, light or buzzer 62 warns the user of this condition.

It should be noted that the invention also contemplates the use of a delayed timing mechanism in conjunction with relay 61 so that the indication will not commence until the tea has brewed for a predetermined period such as, for instance, five minutes.

Figure 4:
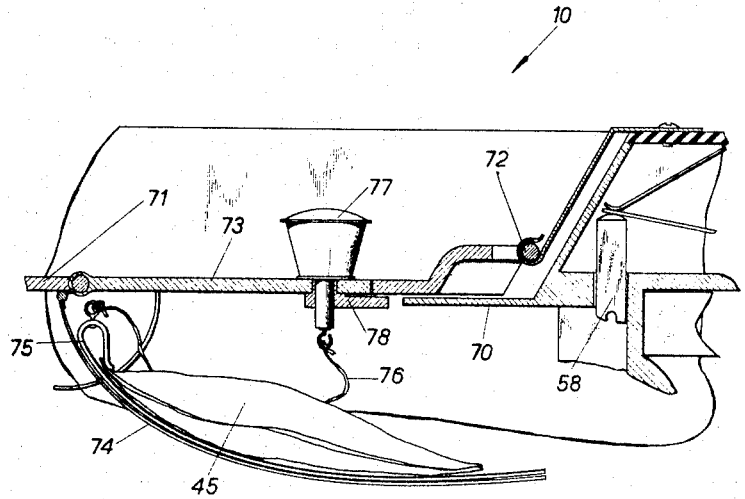
FIG. 4 is an enlarged, sectional side elevation of a lid mechanism adapted for use with the device of FIG. 1, having modified hinge and incorporating a retractable tea bag holder.

Referring to FIG. 4, an alternative lid assembly is shown in which a shoe 70 supports a lid 71 by means of a detachable hinge assembly 72. An access door 73 is adapted to close off an aperture in lid 71 and it is adapted to operate a hinged support plate 74 in a manner similar to that described for plate 26 of FIG. 1. In this instance, however, the teabags are supported in a clip 75 resting on the upper surface of plate 74 upon the latter being in its upper position. A cord 76 extends between clip 75 and the knob 77 of the latch assembly 78 for door 73. Knob 77 is detachably attached to latch 78 by bayonet clip means or the like so that it can be removed while latch 78 is still secured.

Thus, upon the water boiling and support plate 74 being released, clip 75 containing the teabags drops into the water and after the desired brewing period the user may remove the teabags from the water by detaching knob 77 and pulling it up, thereby draining the cord 76 upwardly and raising clip 75, together with the teabags, clear of the water.

It will be further understood that although specific embodiments of this invention have herein been described and illustrated, the invention also contemplates such variations in design and method as may fall within the scope of the subjoined claims.

The embodiments of this invention in which an exclusive property or privilege is claimed are defined as follows:

1. An automatic tea pot including a watertight vessel having an opening in the upper end thereof and embodying heating means; a shoe member detachably attached to said vessel at said opening; an upwardly opening lid hingedly attached to said shoe member; said shoe member and said lid in combination being adapted to sealably close off said opening upon said lid being closed; said lid having an aperture formed therethrough and an upwardly opening access door hingedly attached to said lid; said access door sealing off said aperture upon being moved to its closed position; latch means securing said access door in said closed position; a support plate hingedly attached to the underside of said lid and extending into said vessel; said support plate having a weighted free end remote from said hinge; catch means to retain said free end in a first raised position; said free end being moved clear of said catch means upon said lid moving upwardly and said free end thereafter falling to a second lower position; unidirectional interconnecting means between said access door and said support plate permitting said support plate to be raised into said first position and retained by said catch means upon said access door being substantially fully opened; said access door being closable thereafter independently of said support plate; and said aperture permitting access to the upper surface of said support plate upon said access door being raised.

2. An automatic tea pot including a watertight vessel embodying heating means and having an opening in the upper end thereof, an upwardly opening lid hingedly attached to the rear of said vessel adjacent said opening and adapted to sealably close off said opening; said lid having an aperture formed therethrough and an upwardly opening access door hingedly attached to said lid at the forward end of said aperture adapted to close off said aperture; latch means locking said access door in a closed position on said lid; a support plate having a weighted free lower end and an upper end hingedly attached to the underside of said lid, substantially centrally thereon; said support plate curving downwardly and rearwardly from said hinged upper end; a rearwardly yieldable, resilient reed extending upwardly in a plane at right angles to the plane of movement of said support plate about its hinge; means housing said reed, supporting said reed at its bottom end locating said reed in a position wherein its upper end is within the arc of travel of said free end of said support plate so that, upon said lid being closed, upward arcuate movement of said free end of said support plate causes said free end to strike said reed, said reed yielding rearwardly to permit said free end to pass thereby and said reed resuming its original position upon said free end extending beyond the upper edge of said reed, subsequent downward movement of said support plate being prevented by said free end resting on said upper edge of said reed; the overlap between said free end and said upper edge being such that upward arcuate movement of said lid moving said support plate through said hinged upper end causes said free end to move sufficiently forwardly to become clear of said upper edge and fall arcuately downwardly, clear of said reed; uni-directional interconnecting means between said access door and said support plate permitting said support plate to be raised by upward arcuate movement of said access door and permitting said access door to be lowered independently of said support plate; and said aperture through said lid permitting access to the upper surface of said support plate upon said access door being raised.

3. An automatic tea pot as defined in claim 2 in which said heating means includes an electrical element means for connecting said element with an electrical source; and switch means making or breaking the electrical circuit through said element; means operating said switch means; said operating means being cooperable with said support plate to close said switch means upon said support plate being retained in its uppermost position by said reed and to open said switch means upon said support plate dropping to its lower position.

4. An automatic tea pot as defined in claim 3, said switch means including a fixed contact and a moving contact; a fulcrum arm supporting said moving contact at one end thereof; a push rod in contact with the other end thereof; resilient means biasing said moving contact away from said fixed contact; and said free end of said support plate actuating said push rod to overcome said resilient means and close said contacts upon said free end resting upon said upper edge of said reed.

5. An automatic tea pot as defined in claim 4, including relay means actuating warning means, said relay means being in parallel with said switch and being activated upon said element being deactivated via switch opening.

6. An automatic tea pot as defined in claim 4 including clip means for the retention of teabags; cord means attached at one end to said clip means and at the other end to the knob of said latch mechanism for said access door; and said knob being detachable from said latch to draw said cord upwardly through said access door and remove said clip from the water in said pot.

References Cited by the Examiner

UNITED STATES PATENTS

| | | | |
|---|---|---|---|
| 2,942,541 | 6/1960 | Huck et al. | 99—283 X |
| 3,069,999 | 12/1962 | Morrison | 99—289 X |

FOREIGN PATENTS

| | | |
|---|---|---|
| 550,000 | 5/1932 | Germany. |
| 835,025 | 3/1952 | Germany. |
| 818,743 | 8/1959 | Great Britain. |

WALTER A. SCHEEL, *Primary Examiner.*